United States Patent [19]

Antekeier

[11] Patent Number: 4,735,428
[45] Date of Patent: Apr. 5, 1988

[54] VEHICLE QUARTER FENDER

[75] Inventor: Steven A. Antekeier, North Shores, Mich.

[73] Assignee: Fleet Engineers, Inc., Muskegon, Mich.

[21] Appl. No.: 872,536

[22] Filed: Jun. 10, 1986

[51] Int. Cl.⁴ .............................................. B62P 25/16
[52] U.S. Cl. ............................. 280/454; 280/154.5 R
[58] Field of Search ................ 280/154.5 R, 152 R, 280/152.3, 153 R, 159, 154; 403/344, 290

[56] References Cited

U.S. PATENT DOCUMENTS

| Re. 24,339 | 7/1957 | La Pere | 280/152 |
|---|---|---|---|
| 2,557,147 | 4/1951 | Schatzman | 280/153 |
| 2,914,341 | 11/1959 | Martt | 280/152 |
| 2,972,149 | 2/1961 | Bracesco | 280/152 |
| 3,337,238 | 8/1967 | Weasel, Jr. | 280/154.5 |
| 3,497,237 | 2/1970 | Vis | 280/152 |
| 3,506,282 | 4/1970 | Miyanaga | 280/152 |
| 3,867,049 | 2/1975 | Rice, Jr. | 403/344 |
| 3,922,003 | 11/1975 | Lea | 280/154.5 R |
| 4,148,373 | 4/1979 | Cline | 280/154.5 R |
| 4,268,053 | 5/1981 | Toppins et al. | 280/154.5 R |
| 4,377,294 | 3/1983 | Lockwood et al. | 280/154.5 R |
| 4,406,474 | 9/1983 | Scharf | 280/154.5 R |
| 4,591,178 | 5/1986 | Mortvedt et al. | 280/154.5 R |

OTHER PUBLICATIONS

Advertising literature of Life Time Tenders Youngstown, Ohio 9/83.
Advertising literature of Fleetline Products, Inc. Smyrna, Tennessee, 1983.
Advertising literature of John Heinrich Company, E. Glendale Parks, NV.

*Primary Examiner*—John J. Love
*Assistant Examiner*—Richard Camby
*Attorney, Agent, or Firm*—Varnum, Riddering, Schmidt & Howlett

[57] ABSTRACT

A vehicle quarter fender (10) is adapted to mount to a vehicle frame (12) through a mounting rod (14) rigidly secured to the frame (12). The fender (10) comprises an arcuate panel (16), a rigidifying plate (18) and a mounting tube (19) formed integral with the plate (18). The rigidifying plate (18) is mounted to the panel (16), along substantially the full width of a bottom surface (62) thereof, such that the tube (19) is co-extensive with and extends inwardly and laterally of an inside portion (56) of the panel (16). The plate (18) provides the fender (10) with stability along longitudinal, transverse, and diagonal axes of the fender (10). The mounting tube (19) is adapted to slidably and securely engage the mounting rod (14) to mount the fender (10) to the frame (12).

13 Claims, 3 Drawing Sheets

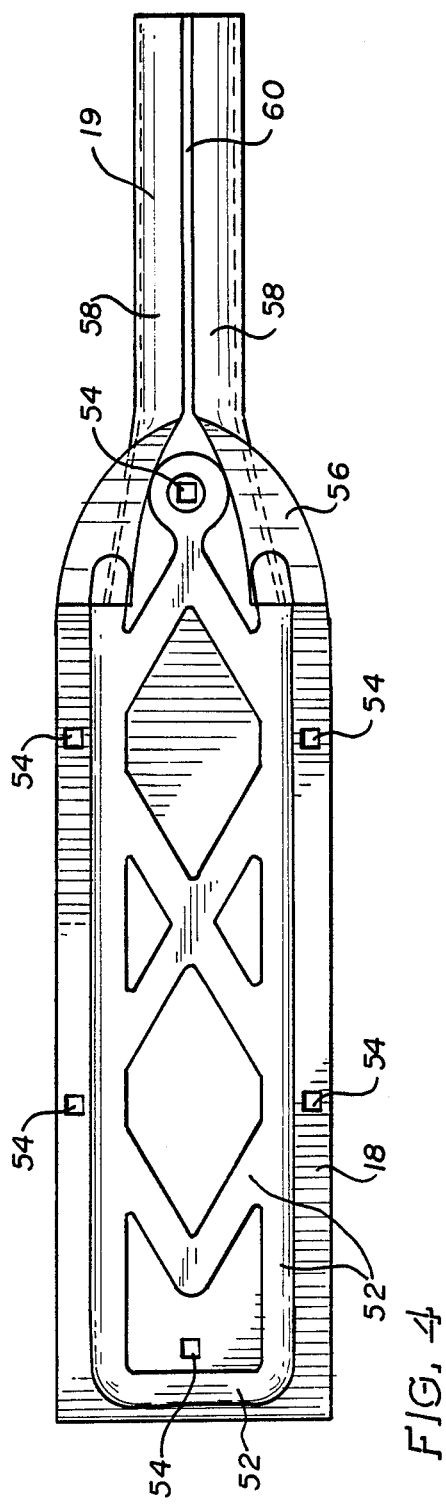
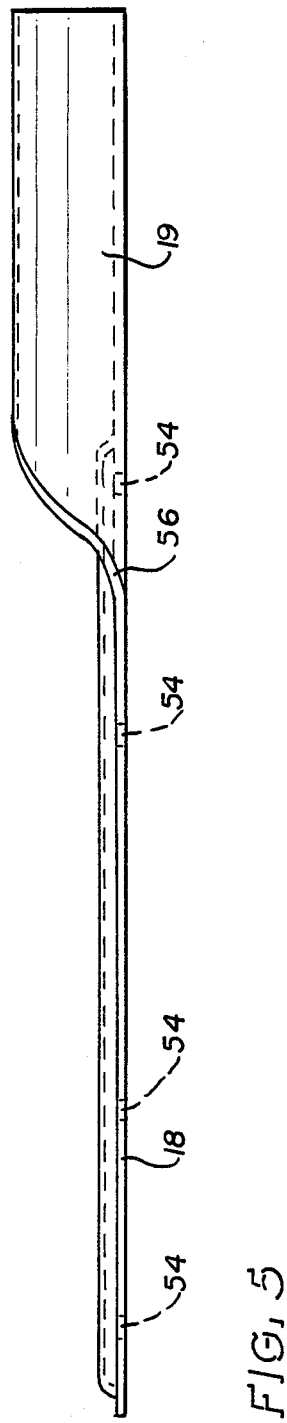

VEHICLE QUARTER FENDER

FIELD OF THE INVENTION

This invention relates to a quarter fender for a truck or other similar vehicle. More particularly, the invention relates to a quarter fender adapted to mount to a truck frame, with a minimum of mounting tube on the top of the fender.

BACKGROUND OF THE INVENTION

Most passenger automobiles are equipped with spray shields in the form of what are called "fenders" for preventing surface materials, such as mud, pebbles, water and the like from being thrown upwardly, laterally, and backwardly by rotating wheels of the vehicle. Most of truck-type vehicles, however, such as dual and tandem wheel tractors, are not always so equipped. Since these vehicles are not always provided by the manufacturers with fender structures, road material thrown off by the rotating wheels of the same results in a visually impenetrable spray into the area alongside of the truck, such spray making it dangerous and almost impossible for a following driver to see around and in front of the truck and thus to pass the same. In addition, the rotating wheels throw off road material onto the truck itself, thereby dirtying the vehicle and possibly causing damage to the same. In order to eliminate these driving hazards and to meet basic safety requirements, which may be statutorily imposed, it is necessary for operators to independently provide protective fenders for their vehicles.

To satisfy the above-identified demand for "after market" quarter fenders, numerous companies have manufactured such fenders and assemblies for mounting the same to the vehicle chassis. For example, quarter fenders that have been available are illustrated in the U.S. Pat. Nos. 4,148,373 to Cline and 4,377,294, Lockwood, et al issued Apr. 10, 1979 and Mar. 22, 1983, respectively. The fenders disclosed by these references are mounted to the vehicle frame through a rod rigidly secured to and positioned along a transverse axis of the same. The fenders generally comprise an arcuately curved panel, which may be formed with longitudinally extending side flanges. In addition, a seat may be formed integral with or rigidly secured to a top side of the panel and positioned along a central transverse axis of the same. The fender also includes a mounting tube rigidly secured to and seated within the panel seat, slidably engaging the mounting rod and having a longitudinally extending slot. At least one clamp circumscribing the tube, in the region of the slot, compresses the tube into tight engagement with the rod to securely mount the fender to the frame. In order to provide the necessary stability and rigidity to the fender under normal operating conditions of the vehicle, it has been necessary to position the seat, and the mounting tube rigidly secured therein, transversely across the majority of the full width of the fender.

Since the market for "after market" quarter fenders has become very competitive, the aesthetic appearance, as well as the quality of construction, of the fenders, has become very important. Thus, it is desirable to construct a quarter fender (1) with the mounting tube extending coextensively with a relatively small portion of the width of the fender and (2) having elements which give optimal stability along longitudinal, transverse and diagonal axes of the fender, but which are hidden from view and mounted to the vehicle.

SUMMARY OF THE INVENTION

A vehicle quarter fender is adapted to mount to a vehicle frame through a rod secured to and positioned substantially transversely of a longitudinal axis of the frame. The quarter fender comprises a panel having a longitudinal axis bottom side and a width; a rigidifying means comprising an elongated plate rigidly secured to the panel extending transversely of said longitudinal axis and over more than one-half of the width of the bottom side of the panel and for providing rigidity to the fender when mounted to the frame; and a mounting means formed integral with the rigidifying means, extending substantially coextensive with and transversely of no more than one-half of the width of the panel and adapted to mount the fender to the rod.

The rigidifying means comprises longitudinal axes and a plurality of stiffening ribs for providing rigidity to the plate and formed integral with and extending along the longitudinal axes, along axes transverse to the longitudinal axes and along axes diagonal to the longitudinal axes.

The mounting means comprises a tube adapted to slidably engage the rod to mount the fender to the frame and having a longitudinally extending slot. The fender also includes at least one clamp adapted to slidably engage the tube and compress the tube, in the region of the slot, into tight engagement with the rod to securely mount the tube to the rod.

The fender further comprises a downwardly depending flange extending along a longitudinal edge of the fender; and a socket in the flange and extending transversely along the panel from the flange to a point on the panel less than one-half of the width of the panel. The tube is mounted in substantially full registry with the socket.

The fender also includes a plurality of first holes; a front portion having a plurality of second holes; and a deflector having a plurality of openings aligned with the second holes. The rigidifying plate has a plurality of orifices aligned with the first holes. A plurality of first bolts extend through the aligned first holes and orifices to rigidly secure the plate to the panel. A plurality of second bolts extend through the aligned second holes and openings to securely mount the deflector to the panel. Finally, the fender includes at least one rib extending along an axis extending along the width of the fender and for providing rigidity to the fender.

BRIEF DESCRIPTION OF THE DRAWINGS

The invention will now be described with reference to the drawings in which:

FIG. 4 is a bottom view of a rigidifying plate and mounting tube of the fender shown in FIGS. 1-3; and FIG. 5 is a side view of the rigidifying plate and mounting tube shown in FIG. 4.

DESCRIPTION OF THE PREFERRED EMBODIMENTS

Figure 1:
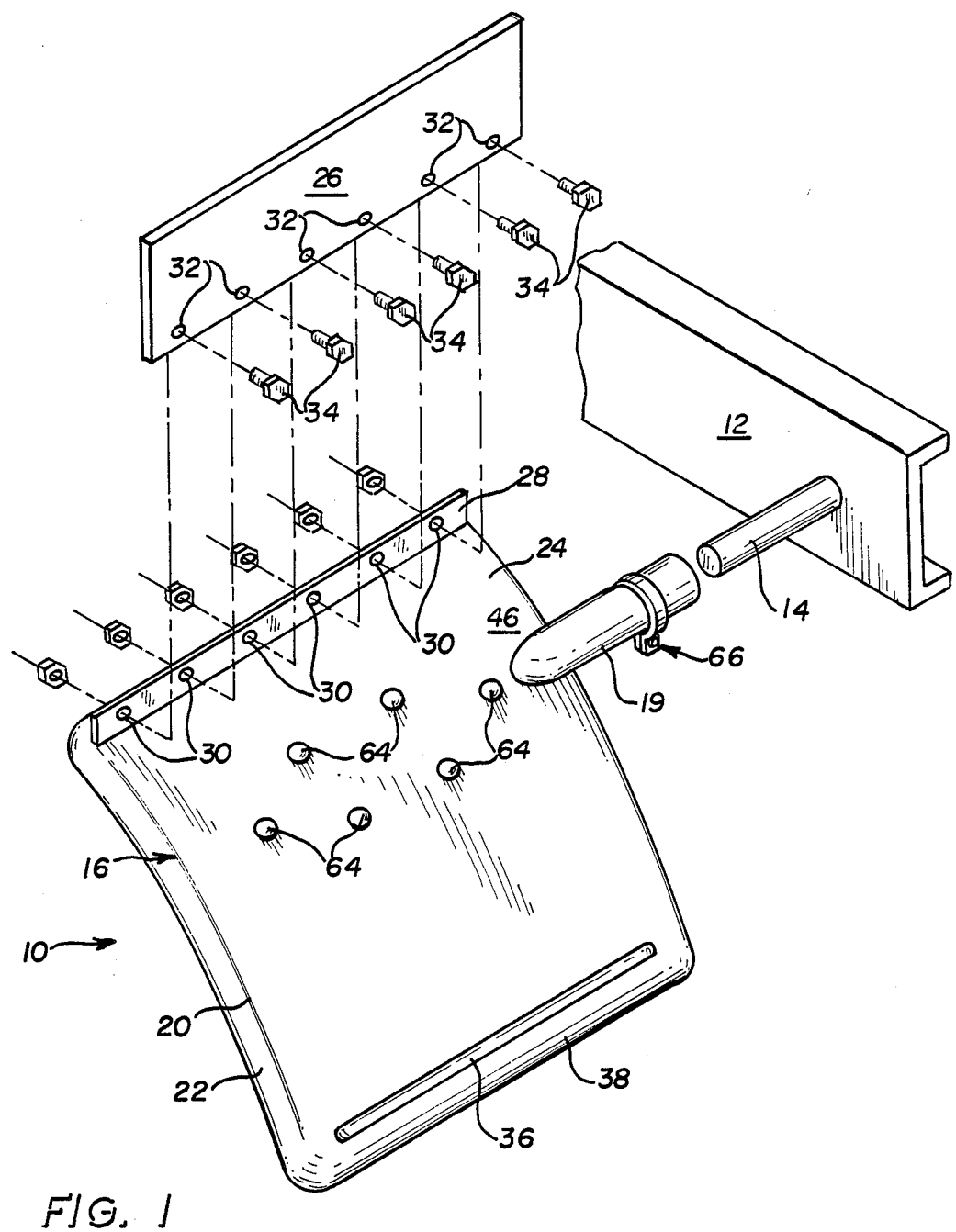
FIG. 1 is a partially exploded perspective view of a quarter fender mounted to a truck frame and in accordance with the invention.

Referring to the drawings, and in particular to FIG. 1, there is shown a quarter fender 12 mounted to a frame 12 of a truck (not shown), or other similar vehicle, through a mounting rod 14. The frame 12 is shown as a substantially C-shaped member, in cross-section, and constitutes that portion of the truck chassis position at a point slightly inward of a set of wheels (not shown) mounted to the truck.

The mounting rod 14 used to mount the fender 10 to the frame 12 is rigidly secured to and positioned transversely of the longitudinal axis of the frame. The mounting rod 14 is of the type conventionally utilized and disclosed in prior patents. For example, as shown in the Lockwood, et al, U.S. Pat. No. 4,377,294, issued Mar. 22, 1983, the mounting rod is shown as a cylindrical tube having welded within the inner end thereof a nut forming a threaded socket in the tube. The mounting rod is secured to the frame by a bolt extending through a hole in the frame and set into tight-threaded engagement with the nut. Alternatively, it is contemplated that the mounting rod 16 may be of the type disclosed in the U.S. patent to Lea U.S. Pat. No. 3,922,003, issued Nov. 25, 1975. Lea shows the mounting rod as an elongated solid bar mattingly engaging and rigidly secured to a top horizontal portion of the frame by a plurality of U-bolts.

The quarter fender 10 comprises a panel 16, a rigidifying plate 18 and a mounting tube 19 formed integral with the rigidifying plate. As most clearly illustrated in FIG. 3, the panel 16 has a generally arcuate shape, along the longitudinal axis thereof, and a width sufficient to span transversely across the wheel set (not shown). In addition, the panel 16 has the longitudinal sides 20 thereof bent downwardly so as to form a pair of flanges 22 on the panel. The flanges 22 function to aid the fender 10 in its ability to deflect material, such as water and rocks, thrown upwardly by the wheels (not shown), when in operation. In addition, the panel 16 is adapted to mount, on a front transverse side 24 thereof, an additional deflector 26. To this end, the panel 16 includes a substantially planar mounting flange 28 formed integral with the front transverse side 24 of the panel and a plurality of first holes 30 extending through the mounting flange. The deflector 26 includes a corresponding number of openings 32 aligned with the first holes 30. At equal number of first bolts 34 extend through the aligned first holes 30 and openings 32 to securely mount the deflector 26 to the panel 16.

Also, the panel 16 has a first stiffening rib 36 formed integral with and extending along a transverse axis of the rear side 38 of the panel. In addition to lending rigidity to the panel 16, along the longitudinal axis thereof, the first rib 36 adds to the aesthetic attractiveness of the fender 10. The panel 16 further includes the plurality of second holes 40 extending through a central portion 42 of the panel, and a socket 44 formed on the inside downwardly depending flange 22 of the panel and on an inside part 46 of the same.

The rigidifying plate 18 functions to provide the fender with stability when mounted to the frame. The rigidifying plate 18 is an elongated substantially rectangular member having a plurality of second stiffening ribs 52 extending along longitudinal, transverse and diagonal axes of the plate and a plurality of orfices 54 equaling the number of second holes 40 of panel 16.

The mounting tube 19 is formed integral with an inside portion 56 of the rigidifying plate 18. The mounting tube 19 is formed by rolling the longitudinal edges 58 of the plate 18 toward each other until the edges are positioned in parallel spaced-apart relationship, defining an elongated slot 60 therebetween.

The rigidifying plate 18 and tube 19 are mounted to the panel 16 such that the plate 18 mattingly engages a bottom surface 62 of the panel, the orfices 54 of the plate are aligned with the second holes 40 of the panel and the mounting tube 19 is set in registry with the socket 44. A plurality of second bolts 64 are adapted to extend through the aligned orfices 54 and second holes 40 to rigidly secure the plate 18, and tube 19, to the panel 16.

Figure 3:
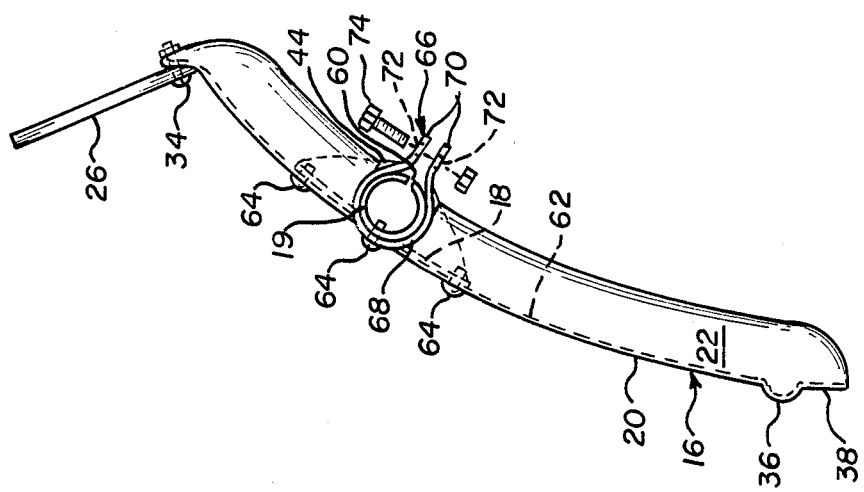
FIG. 3 is a side elevational view of the quarter fender shown in FIGS. 1 and 2.

The mounting tube 19 is adapted to slidably and rotatably engage and securely clamp to the mounting rod 14 to mount the fender 10 to the vehicle frame 12. The elongated slot 60 enables the mounting tube 19, when mounted to the rod 14, to become compresses or collapsed, within the region of the slot, into a secure clamped engagement around the mounting rod. As shown in FIG. 3, this collapsing is obtained by the use of at least one compression clamp 66 slidably mounted to and circumscribing the mounting tube 19 in the region of the slot 60. The clamp 66 comprises an arcuate portion 68 having a curved surface coinciding with and mattingly engaging the curved surface of the mounting tube 19 and a pair of arms 70 formed integral or rigidly secured to the arcuate portion 68. The arms 70 have a pair of aligned apertures 72 extending therethrough. A third bolt 74 extends through the aligned apertures 72. Subsequent to slidably engaging the tube 19 with the rod 14, the third bolt 74 is tightened which results in compression of the mounting tube 19 and the secure mounting of the tube to the rod. The telescopic relationship between the tube 19 and the rod 14 enables the fender 10, carried by the tube, to be adjusted angularly as well as axially as is desired or as may be necessary to properly position the fender relative to the wheel set (not shown).

During the manufacturing process, the panel 16 is constructed of a sheet of metal which, in a single step, is stamped to give the panel its arcuate shape, to form on the same the longitudinally extending side flanges 22 and to punch out second holes 40 extending through the panel. Similarly, the rigidifying plate 18 is made out of a sheet of metal which in one step, is stamped to form second stiffening ribs 52 on and orfices 54 through the plate. The tube 19 is manufactured by, as stated previously, simply rolling the longitudinal side edges 58 of the inside portion 56 of the plate toward each other until the edges are set in parallel, spaced-apart relationship. In this manner, the fender 10, including the plate 18 and tube 19, is economically manufactured in three simple sets from two pieces of stock sheet metal.

Figure 2:
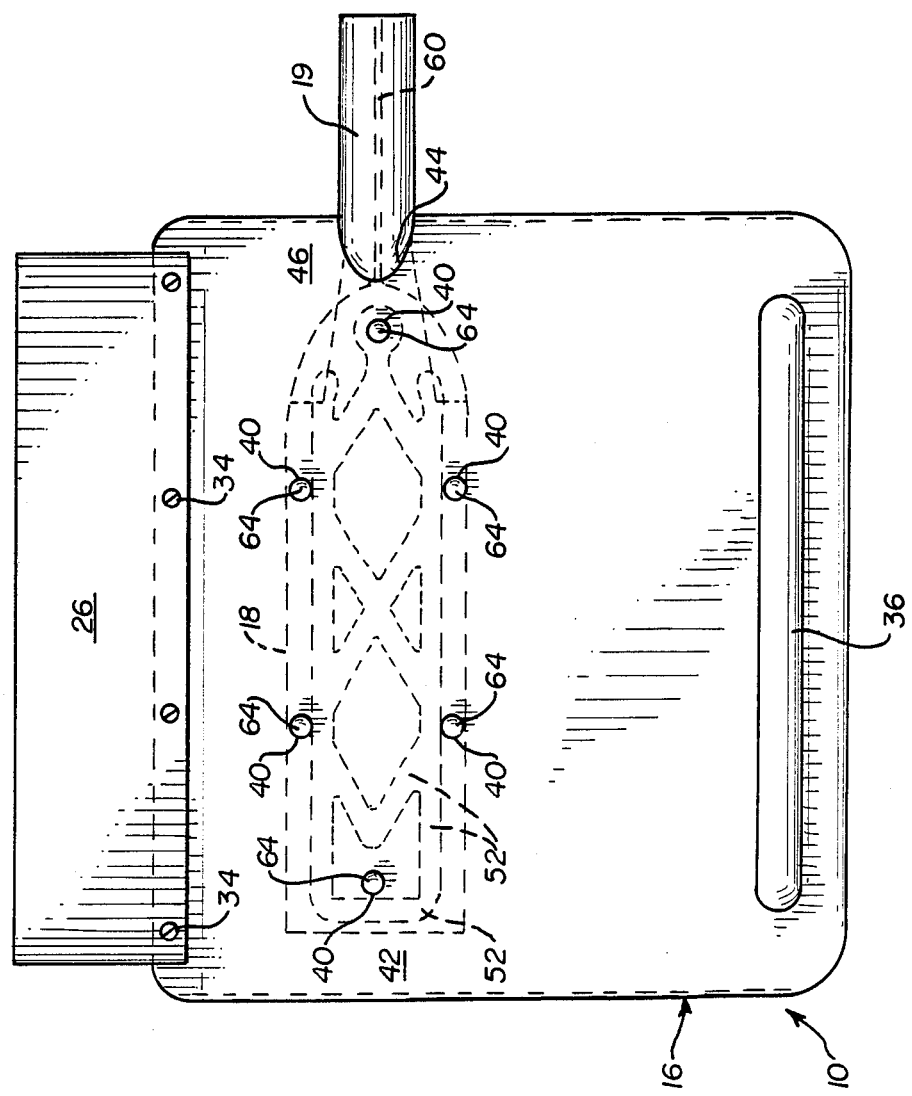
FIG. 2 is a plan view of the quarter fender shown in FIG. 1.

Stability along longitudinal, transverse and diagonal axes of the fender 10 is achieved primarily by the rigidifying plate 18 which, as shown in FIG. 2, is hidden from view when the fender 10 is mounted to the frame 12. The plate 18 extends substantially along the full width of the fender 10, along a bottom surface 62 thereof. To aid in rigidifying the fender 10, the plate 18 has formed thereon a plurality of second stiffening ribs 52. Specifically, the second ribs 52 extend longitudinally and transversely over substantially the full length and width, respectively, of the plate 18. In addition, the second ribs 52 extend along diagonal axes of the bracket to form a criss-cross pattern on the same. In this manner, the second ribs 52 give optimal stability and rigidity to the fender 10 under all normal operating conditions of the vehicle (not shown).

As best illustrated in FIGS. 2 and 3, the mounting tube 19 is substantially coextensive with less than one-half of the width of the fender 10. By this construction, the fender 10 is supported from the vehicle frame 12 by a supporting element visible over a relatively small inside portion 56 of the fender 10. Since the mounting tube 19 does not extend across substantially the entire width of the fender 10, the fender is relatively aerodynamic and considered aesthetically attractive relatively to prior art quarter fenders with mounting tubes extending transversely across substantially the full width of fender. In addition, the fender 10 is equally as rigid as, if not more so than, prior art fenders due to the rigidifying plate 18 which extends across the full width of the panel 16, along the bottom suface 62 thereof.

As indicated previously, the fender 10, including the rigidifying plate 18 and the mounting tube 19, is preferably made of metal, such as cold rolled steel, galvanized steel, stainless steel, or aluminum. It is contemplated, however, that the fender can be constructed of molded plastic, such as a high density polyethylene. In addition, the deflector 26 is preferably made of molded polyethylene, rubber, vinyl or other flexible synthetic material.

While the invention has been described in connection with a preferred embodiment, it will be understood that we do not intend to limit the invention to that embodiment. To the contrary, we intend to cover all alternatives, modifications and equivalents as may be included within the spirit and the scope of the invention as defined by the appended claims.

The embodiments of the invention in which an exclusive property or privilege is claimed are defined as follows:

1. A quarter fender for a vehicle comprising a panel having a longitudinal axis, a bottom side and a width, and adapted to mount to a vehicle frame through a rod secured to and positioned substantially transversely of a longitudinal axis of said frame, wherein the improvement in said fender comprises:
   a rigidifying means comprising an elongated plate rigidly secured to said panel, said plate extending transversely of said longitudinal axis of said panel and over more than one-half of said width of said bottom side of said panel and said rigidifying means providing rigidity to said fender when mounted to said frame; and
   a mounting means comprising a tube integral with said rigidifying means, extending substantially coextensive with and transversely of no more than one-half of said width of said panel and adapted to engage said rod to mount said fender to said rod.

2. A fender according to claim 1, wherein said tube has a longitudinally extending slot; and
   said fender further comprises at least one clamp adapted to slideably engage said tube and compress said tube, in the region of said slot, into tight engagement with said rod to securely mount said tube to said rod.

3. A fender according to claim 1, wherein said plate comprises a plurality of stiffening ribs for providing rigidity to said plate.

4. A fender according to claim 1, wherein said plate has a longitudinal axis and a plurality of stiffening ribs for providing rigidity to said plate; and
   said mounting means comprises a tube adapted to slideably engage said rod to mount said fender to said frame.

5. A fender according to claim 4, wherein said stiffening ribs are formed integral with and extend along said longitudinal axis, along axes transverse to said longitudinal axis and along axes diagonal to said longitudinal axis.

6. A fender according to claim 5, wherein said tube has a longitudinally extending slot; and
   said fender further comprises at least one clamp adapated to slideably engage said tube and compress said tube, in the region of said slot, into tight engagement with said rod to securely mount said tube to said rod.

7. A fender according to claim 6, wherein said fender further comprises the front portion and a deflecter securely mounted to said front portion.

8. A fender according to claim 7, wherein said fender further comprises at least one rib extending along an axis extending along said width of said fender and for providing rigidity to said fender.

9. A fender according to claim 6, wherein said fender further comprises a downwardly-depending flange extending along longitudinal edge of said fender and having a socket; and
   said tube extends through said socket.

10. A fender according to claim 9, wherein said socket extends transversely along said panel from said downwardly-depending flange to a point on said panel less than one-half of said width of said panel; and
    said tube is mounted in substantially full registry with said socket.

11. A fender according to claim 10, wherein said panel further comprises a plurality of first holes;
    said rigidifying plate further comprises a plurality of orfices aligned with said first holes: and
    said fender further comprises a plurality of first bolts extending through said aligned first holes and orfices to rigidly secure said plate to said panel.

12. A fender according to claim 11, wherein said panel further comprises a front portion having a plurality of second holes; and
    said fender further comprises a deflector having a plurality of openings aligned with said second holes and a plurality of second bolts extending through said aligned second holes and openings to rigidly mount said deflector to said panel.

13. A fender according to claim 12, wherein said fender further comprises at least one rib extending along an axis extending along said width of said fender and for providing rigidity to said fender.

* * * * *